(12) United States Patent
Fechter et al.

(10) Patent No.: US 7,271,204 B2
(45) Date of Patent: *Sep. 18, 2007

(54) LIQUID OLIGOMERIC COMPOSITIONS CONTAINING ACRYLATE UNSATURATION AND POLYBUTADIENE SEGMENTS

(75) Inventors: Robert B. Fechter, Worthington, OH (US); David A. Hutchings, Dublin, OH (US); Edward G. Toplikar, Hilliard, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/967,449

(22) Filed: Oct. 18, 2004

(65) Prior Publication Data
US 2006/0084715 A1 Apr. 20, 2006

(51) Int. Cl.
*C08F 2/46* (2006.01)
(52) U.S. Cl. .................... 522/174; 522/90; 522/95; 522/96; 522/150; 522/153; 522/154; 522/173; 522/152; 522/178; 522/182; 522/71
(58) Field of Classification Search .............. 522/90, 522/95, 96, 150, 152, 153, 154, 173, 174, 522/178, 182, 71
See application file for complete search history.

(56) References Cited

U.S. PATENT DOCUMENTS

| 4,874,129 | A | 10/1989 | DiSapio et al. | |
| 2005/0214725 | A1 | 9/2005 | St. Clair | |
| 2005/0215725 | A1* | 9/2005 | St. Clair | 525/314 |
| 2006/0083709 | A1* | 4/2006 | Hutchings et al. | 424/76.1 |

FOREIGN PATENT DOCUMENTS

| DE | 2608533 | 9/1976 |
| JP | 531978146744 | 12/1978 |
| JP | 59198433376 | 2/1984 |
| JP | 63198881112 | 4/1988 |
| JP | 41992331141 | 11/1992 |

* cited by examiner

*Primary Examiner*—Sanza L. McClendon
(74) *Attorney, Agent, or Firm*—Martin Connaughton

(57) ABSTRACT

UV curable, liquid, oligomeric compositions are prepared from the reaction product of a Michael addition oligomer and an isocyanate capped polybutadiene. The UV curable, liquid, oligomeric compositions can be cured in the presence of fragrances to form articles that are characterized by a controlled release of the fragrance over time.

14 Claims, No Drawings

LIQUID OLIGOMERIC COMPOSITIONS CONTAINING ACRYLATE UNSATURATION AND POLYBUTADIENE SEGMENTS

BACKGROUND OF THE INVENTION

The present invention relates to UV curable, liquid, oligomeric compositions comprising a reaction product of a Michael addition oligomer and an isocyanate capped polybutadiene. Examples of Michael addition oligomers include those disclosed in U.S. Pat. Nos. 5,945,489 and 6,025,410 the contents of which are incorporated herein by reference.

Much effort has been expended to develop sustained release systems for fragrances. German published application DE 2608533 discloses a hard polymer matrix employing a variety of monomer blends. A fragrance can be added to the mixture prior to polymerization and the complete mixture polymerized via UV photo-polymerization to form fragrance releasing articles. Japanese published application 53-146744 discloses a method of producing a fragrant article characterized in that a photosensitive resin is mixed with a perfume and the resulting photosensitive composition is cured by irradiation. Japanese published application 59-33376 discloses a fragrant adhesive sheet wherein an adhesive is coated on a base sheet and irradiated with an electron beam to introduce a cross-linked structure. Japanese published application 4-331141 discloses a multi-layer film having a slow release function consisting of a storage layer containing an active substance and a discharge control layer for controlling the discharge speed of the active substance. Japanese published application 63-81112 discloses a photosetting aromatic gel comprised of a photosetting resin containing a urethane acrylate, N-vinylpyrrolidone and a photosensitizer, and a perfume. The application further discloses that the polyol used in the urethane acrylate can include a hydrogenated 1,4-polybutadiene having hydroxyls at the end of the molecule. U.S. Pat. No. 4,874,129 discloses fragrance controlled release devices constucted from silicone elastomers and/or silicone pressure sensitive adhesives. None of the cited references disclose the UV curable, liquid oligomeric composition of the present invention. The composition of the present invention can be used to form a system that when cured via irradiation, in the presence of a fragrance and optional carrier solvent, releases the fragrance in a controlled, sustained fashion.

BRIEF SUMMARY OF THE INVENTION

The liquid, oligomeric compositions of the present invention are prepared from the reaction product of a Michael addition oligomer and an isocyanate capped, polybutadiene. The Michael addition oligomer comprises the reaction product of a β-dicarbonyl compound and a multiacrylate compound having at least one isocyanate reactive group, and/or a mixture of an acrylate compound having at least one isocyanate reactive group and at least one multiacrylate compound, where the resulting oligomer contains on average at least one isocyanate reactive group per mole and at least 1.5 free acrylate groups per mole. An example of the isocyanate capped polybutadiene is the reaction product a polybutadiene molecule terminated with hydroxyl groups and a diisocyanate compound present in an amount sufficient to react with the terminal hydroxyl groups present on the polybutadiene molecule. Preferred isocyanate capped polybutadienes are those having a linear structure with as few side chains on the backbone of the molecule as possible. This type of linear isocyanate terminated polybutadiene is commercially available from Sartomer.

The liquid, oligomer compositions can be mixed with a fragrance and optionally a carrier solvent for the fragrance and cured to form a system that releases the fragrance in a controlled fashion over time. For purposes of the invention "liquid, oligomeric composition(s)" include those compositions described herein containing Michael addition oligomers and other components including those components that can be referred to generically as polymeric or polymers. The UV curable, liquid oligomers containing polybutadiene provide a system that is accepting of fragrance based materials and overcomes typical short comings observed in known UV curable systems. These deficiencies include shrinkage, brittleness and cracking. In addition the liquid, oligomeric compositions can be cured on exposure to UV irradiation with little or no photoinitiators present in the composition.

DETAILED DESCRIPTION OF THE INVENTION

The liquid, oligomeric compositions of the present invention are prepared from the reaction product of a Michael addition oligomer and an isocyanate capped polybutadiene. Other components such as catalysts, fillers, tackifiers etc. can also be present. In addition, fragrances can be added to the liquid, oligomeric compositions prior to the final cure.

The Michael addition oligomers comprise the reaction product of a β-dicarbonyl compound (Michael donor) such as β-ketoester, β-diketone, β-ketoamide, β-ketoanilide or mixture thereof and a multiacrylate compound having at least one isocyanate reactive group and/or a mixture of an acrylate compound having at least one isocyanate reactive group and at least one multiacrylate compound (Michael acceptor). The Michael addition oligomers are prepared by known methods such as those disclosed in U.S. Pat. Nos. 5,945,489 and 6,025,410. The Michael addition oligomer used in the current invention has on average one isocyanate reactive group and at least 1.5 free acrylate groups per mole.

Examples of the β-dicarbonyl compound include β-dicarbonyl compounds having functionality of 2 such as, ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxyethyl acrylate, 2-acetoacetoxyethyl methacrylate, allyl acetoacetate, benzyl acetoacetate, 2,4-pentanedione, isobutyl acetoacetate, and 2-methoxyethyl acetoacetate.

Suitable β-dicarbonyl donor compounds having functionality of 4 include 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate.

Suitable β-dicarbonyl donor compounds having functionality of 6 include, trimethylol propane triacetoacetate, glycerin triacetoacetate, and polycaprolactone triacetoacetates.

Suitable multiacrylate compounds having at least one isocyanate reactive group includes those acrylates having more than one acrylate group per molecule and at least one isocyanate reactive group per molecule. Examples of isocyanate reactive group are those groups capable of reacting with the isocyanate (—NCO) portion of a molecule and includes epoxy, hydroxyl, amine and thiol groups. A suitable multiacrylate compound having at least one isocyanate reactive group includes pentaerythritol triacrylate.

Suitable acrylates having at least one isocyanate reactive group are monoacrylates having at least one isocyanate reactive group. Examples include 2-hydroxyethylacrylate, 2-hydroxypropylacrylate, 4-hydroxybutylacrylate, δ-lactone extensions of hydroxyethyl, hydroxypropyl or hyroxybutylacrylate containing δ-caprolactone moieties; γ-butyrolactone extensions of hydroxyethyl, hydroxypropyl or hydroxybutylacrylate containing 1-4 γ-butyrolactone; polyalkoxylate adducts of hydroxyethyl, hydroxypropyl and hydroxybutylacrylates based on ethylene and propylene oxide and lactoyl lactate derivatives of hydroxyalkylesters of acrylic acid.

Multiacrylates are acrylates free of isocyanate. reactive groups and having more than one acrylate group. Examples include diethyleneglycol diacrylate, polyethyleneglycol diacrylate, ethoxylated bisphenol A diacrylate, trimethylolpropane triacrylate (TMPTA), ethoxylated and propoxylated TMPTA, propoxylated glyceryl triacrylate and pentaerythritol tetraacrylate (PETA).

The Michael addition reaction is catalyzed by a strong base. An example of such a base is diazabicycloundecene (DBU), which is sufficiently strong and is readily soluble in the monomer mixtures. Other cyclic amidines, for example diazabicyclo-nonene (DBN) and guanidines are also suitable for catalyzing this reaction. Group I alkoxide bases such as potassium tert-butoxide, provided they have sufficient solubility in the reaction medium, are also typically adequate to promote the desired reaction. Quaternary hydroxides and alkoxides, such as tetrabutyl ammonium hydroxide or benzyltrimethyl ammonium methoxide, comprise another class of base catalysts that promote the Michael addition reaction. Finally, strong, organophilic alkoxide bases can be generated in situ from the reaction between a halide anion (e.g., quaternary halide) and an epoxide moiety. Such in situ catalysts are disclosed in pending application Ser. No. 10/255,541 assigned to Ashland Inc., the assignee of the present application. The entire contents of U.S. application Ser. No. 10/255,541 are specifically incorporated by reference in its entirety and for all purposes.

The isocyanate terminated butadienes used to form the liquid oligomeric compositions are the reaction product of a hydroxyl capped polybutadiene and an isocyanate such as toluene diisocyanate, diphenylmethane diisocyanate and the like. Examples of commercially available polybutadienes include the materials from Sartomer under the trademark Krasol. The preferred polybutadiene is an essentially difunctional molecule with little or no functional groups attached along the backbone of the polybutadiene.

A fragrance may consist of one or more natural products, oils and synthetic substances. Examples of such materials are orange oil, rose oil, eugenol, benzaldehyde and cinnamonaldehyde. These materials can be used as is or as a fragrance/solvent blend. The use of a solvent is preferred and it is believed to serve the function of transporting agents for the active components from the interior to the surface of the composite. Solvents also lower the vapor pressure requirements of the active agent leaving the composite surface. Interaction of the fragrance and carrier solvent with the polybutadiene component of the composite matrix is believed to be one of the keys to the unique controlled release performance of the cured oligomeric compositions. These solvents can be a variety of materials such as glycols, esters, and phthalates to name a few.

A nonexhaustive list examples of useful solvents includes dipropylene glycol, diethyl phthalate, benzyl benzoate etc. A fragrance or fragance/solvent blend can be present in the UV curable liquid oligomeric composition in amounts of up to 60 wt %. Preferably the fragrance/solvent blend is present in amounts of from about 30 to 50 wt % based on the weight of the total weightof the UV curable composition and the fragrance or fragrance/solvent blend.

The Michael addition oligomers are reacted with an isocyanate terminated butadiene preferably in the presence of a catalyst to promote the reaction between the isocyanate reactive group and the terminal isocyante groups of the butadiene molecule. The catalyst(s) used are those known in the art to promote the formation of the urethanes. Examples of suitable catalysts include tertiary amines and tin(II) and tin(IV) salts of carboxylic acids. Examples of tertiary amines includes N-ethyl morpholine, N,N,N',N'-tertamethylethylene diamine, 1,4-diazobicyclo-(2,2,2)-octane, 1,2-dimethyl imidazole and the like. Examples of tin (II) and tin(IV) salts of carboxylic acids include tin(II)-acetate, tin(II)-laurate, dibutyl tin dilaurate, dioctyl tin diacetate and the like.

In general the UV curable liquid oligomeric composition is prepared and then the fragrance/solvent blend is added.

Photoinitiators can be used to cure the present UV curable, liquid oligomeric compositions but the photoinitiator is present in significantly reduced amounts when compared to known UV curable compositions. Typical levels for photoinitiators in conventional UV curable resin formulations can be 10 wt. %. Photoinitiators used in the present invention are present in amounts from 0 to 5 wt % based on the total weight of the liquid UV curable oligomeric composition. The range of photoinitiator used is dictated by any number of factors including opacity, thickness of the film, etc. and is typically from about 2.0 to about 4.0 wt %.

Examples of suitable photoinitiators include those known in the art such as benzoin, benzoin methyl ether, 2-benzyl-2-dimethylamino-1-(4-morpholinophenyl)-1-butanone, 1-hydroxycyclohexyl phenyl ketone, benzophenone, 4-phenyl benzophenone, acetophenone, diphenyl(2,4,6-trimethylbenzoyl)phosphine oxide (TPO) and the like.

The structure of the UV curable, liquid oligomeric composition incorporating a polybutadiene, provides a composition accepting of fragrance based material while overcoming the deficencies of typical UV curable materials. The presence of the polybutadiene enhances the flexibility of the oligomeric composition allowing for thick films of fragrance containing compositions. In addition the UV curable, liquid, oligomeric compositions do not require the presence of monomers such as acrylic and/or methacrylic monomers to cure.

In addition, other materials and additives may be incorporated into the resin systems. These might include fillers, dyes, UV stabilizers and tackifiers, Examples of tackifiers include those based upon rosin ester or terpenes. Examples of dyes would be those that are commercially available, soluble in organic solvents and compatible with the fragrance/resin mixtures.

Having thus described the invention, the following examples are provided for illustration purposes only.

EXAMPLE 1

Preparation of Hydroxyl-functional Michael adduct

Into a 1000 ml. cylindrical glass reactor were placed 41.94 g. (0.3223 mol.) ethyl acetoacetate, 41.17 g. (0.3545 mol.) 2-hydroxyethyl acrylate, 105.05 g. (0.3545 mol.) trimethylolpropane triacrylate, 1.98 g. (0.00614 mol.) tetrabutylammonium bromide catalyst, and 7.92 g. (0.0557 mol.) glycidyl methacrylate co-catalyst. The flask was fitted with a heating mantle and capped with a reactor cover fitted with a mechanical stirrer, thermometer, and reflux condenser. The reaction mixture was stirred and heated to 95°

C. in one hour. The mixture was held at 95° C. and monitored by refractive index and viscosity (Brookfield CAP2000L cone and plate viscometer with Cone #06). After two hours, the refractive index reached 1.4816 (25° C.) and viscosity reached 53.5 poise at 25° C. (500 rpm, 30 sec.). The reaction mixture was then cooled to 50°0 C. and the catalyst was quenched with 1.94 g. (0.00922 mol.) Ebecryl® 168 (UCB Chemicals) The finished Michael adduct was obtained after stirring at 50° C. an additional 15 minutes.

EXAMPLE 2

Reaction of Michael Adduct with Isocyanate-capped Polybutadiene

The reactor containing the adduct of Example 1 (1846.6 g) was flushed and blanketed with dry air. To the reactor was added Krasol LBD 2000 (4616.4 g) (toluene diisocyanate polybutadiene prepolymer from Sartomer Company), dibutyltin dilaurate (3.9 g), hydroquinone (0.162 g) and 1,4 naphthoquinone (0.388 g). The mixture was heated with stirring to 80° C. over a one hour period. At the end the hour the pressure in the reactor was reduced 28 mm Hg while the temperature was held constant at 80° C. for 90 minutes. The reactor was brought back to atmospheric conditions. Dipropylene glycol (124.4 g) was added to the mixture. The contents of the reactor were allowed to stir for 30 minutes. A fragrance/solvent blend (3185.4 g) was then added to the reactor along with Irgacure 184 (193.6 g) and Genocure TPO (29.2).

Sample Preparation

Approximately 3.5 g of a 33% fragrance/solvent blend containing resin mixture (Example 2) were coated on to 3"×3" polycarbonate squares. These coatings were cured using a Fusion 600 W/in H bulb source with a line speed between 30-40 fpm. Two samples of each fragrance/solvent blend were prepared. One sample was placed in a cubicle office. The other sample was placed in a exhaust hood. These will be referred to in the tables as static (S) and dynamic (D) environments. The following table shows a summary of the total weight loss of the sample, the theoretical amount of fragrance in the sample and the percent of "fragrance" remaining. The table below shows typical weight loss data and detectable fragrance data for samples produced with this novel photocurable polymer.

| Sample | Days | Total Weight Loss | Theoretical Amount Of Fragrance | % Fragrance Remaining |
|---|---|---|---|---|
| 1 layer-33% Country Berries (S) | 44 | 0.5923 | 1.0036 | 41.0 |
| 1 layer-33% Country Berries (D) | 44 | 0.5788 | 1.0224 | 43.4 |
| 1 layer-33% Rain Forest (S) | 45 | 0.4491 | 0.974 | 53.9 |
| 1 layer-33% Rain Forest (D) | 45 | 0.4176 | 0.9685 | 56.9 |

| | Detectable Fragrance Day 29 | Detectable Fragrance Day 45 |
|---|---|---|
| 1 layer-33% Country Berries (S) | Yes | No |
| 1 layer-33% Country Berries (D) | Yes | No |
| 1 layer-33% Rain Forest (S) | Yes | Yes |
| 1 layer-33% Rain Forest (D) | Yes | No |

The key here is that the samples have detectable fragrance for nearly 30 days and in one case 45 days. This is a significant improvement over current paper products which may last 10-14 days.

Further samples were tested for 30 days only.

Sample Preparations

A "picture frame" is created out of 4 tongue depressors and mounted to a polyester sheet. This frame creates the boundaries in which a 33% fragrance containing resin sample is poured. The typical sample dimensions are approximately 2"×2"×1.5 mm. The liquid resin sample is cured similar to the examples above. After curing, the frame is removed to yield a cured fragrance containing gel sample. The weight loss data for some representative samples is listed below. The testing was conducted for a period of only 30 days. These samples are compared to a paper blotter sample which has dimensions of 3½"×2¾"×2.4 mm. The paper blotter is dosed with 2.0 g of fragrance. The samples are place in a Rubbermaid container (12 qt.) for a period of 15 min. to help determine the level of fragrance released.

| Sample | Days | Total Weight Loss | Theoretical Amount Of Fragrance | % Fragrance Remaining |
|---|---|---|---|---|
| 1 layer-33% Country Berries | 30 | 0.9189 | 1.444 | 36.4 |
| 1 layer-33% Vanilla Indulgence | 30 | 1.211 | 1.982 | 38.9 |
| 1 layer-33% Sparkling Citrus | 30 | 1.026 | 1.81 | 43.3 |
| 1 layer-33% Rain Garden | 30 | 1.019 | 1.905 | 46.5 |
| 1 layer-33% Vanilla Breeze | 30 | 1.227 | 1.705 | 28.1 |

| Detectable Fragrance (Strength) (Day 35) | |
|---|---|
| 33% Country Berries | Yes (moderate) |
| 33% Country Berries (Paper) | Yes (moderate) |
| 33% Vanilla Indulgence | Yes (moderate) |
| 33% Vanilla Indulgence (Paper) | Yes (slight) |
| 33% Sparkling Citrus | Yes (slight to moderate) |
| 33% Sparkling Citrus (Paper) | Yes (very slight) |
| 33% Rain Garden | Yes (slight) |
| 33% Rain Garden (Paper) | Yes (slight) |
| 33% Vanilla Breeze | Yes (very slight) |
| 33% Vanilla Breeze (Paper) | Yes (very slight) |

We claim:

1. A UV curable liquid oligomeric composition, comprising the reaction product of;
   A. a Michael addition oligomer, comprising the reaction product of;

i. a β-dicarbonyl compound, and
ii. a multiacrylate compound having at least one isocyanate reactive group and/or a mixture of an acrylate compound having at least one isocyanate reactive group and a multiacrylate compound, and B. an isocyanate capped, polybutadiene, wherein the Michael addition reaction product contains on average one isocyanate reactive group and at least 1.5 free acrylate groups per mole.

2. The composition as claimed in claim 1, wherein the β-dicarbonyl compound is a β-ketoester, β-diketone, β-ketoamide, β-ketoanilide or mixture thereof.

3. The composition as claimed in claim 1, further comprising a photoinitiator.

4. The composition as claimed in claim 1, further comprising a fragrance.

5. The composition as claimed in claim 4, further comprising a solvent.

6. The composition as claimed in claim 1, wherein the Michael addition oligomer comprises a multiacrylate compound having at least one isocyanate reactive group.

7. The composition as claimed in claim 1, wherein the Michael addition oligomer comprises a mixture of an acrylate compound having at least one isocyanate reactive group and a multiacrylate compound.

8. The composition as claimed in claim 1, further comprising one or more filler, dye, UV stabilizer or tackifier.

9. The composition as claimed in claim 3, wherein the photoinitiator is present in amounts up to about 5.0 wt % based on the total weight of the UV curable composition not including the fragrance or fragrance/solvent blend.

10. The composition as claimed in claim 3, wherein the photoinitiator is present in amounts from about 2.0 to 4.0 wt % based on the total weight of the UV curable composition not including the fragrance or fragrance/solvent blend.

11. The composition as claimed in claim 4, wherein the fragrance or fragrance/solvent blend is present in an amount of up to about 60 wt % based on the total weight of the UV curable compositon and the fragrance or fragrance/solvent blend.

12. The composition as claimed in claim 4, wherein the fragrance or fragrance/solvent blend is present in an amount from about 30 to 50 wt % based on the total weight of the UV curable composition and the fragrance or fragrance/solvent blend.

13. A UV curable liquid oligomeric composition, comprising the reaction product of:

A. A Michael addition oligomer, comprising the reaction product of:
i. a β-dicarbonyl compound, and
ii. a multiacrylate compound having at least one isocyanate reactive group and/or a mixture of an acrylate compound having at least one isocyanate reactive group and a multiacrylate compound, B. an isocyanate capped polybutadiene, and C. up to about 5 wt % of a photoinitiator based on the total weight of the UV curable composition, wherein the Michael addition reaction product contains on average one isocyanate reactive group and at least 1.5 free acrylate groups per mole, and D. up to 60 wt % of a fragrance or fragrance/solvent blend based on the total weight of the UV curable composition and the fragrance or fragrance/solvent blend.

14. The cured residue of the composition of claim 13.

* * * * *